May 10, 1955 M. A. HERLIN 2,708,222

WIDE TUNING STABILIZER

Filed March 14, 1946

INVENTOR
MELVIN ARNOLD HERLIN

BY M. A. Hayes

ATTORNEY

United States Patent Office 2,708,222

Patented May 10, 1955

2,708,222

WIDE TUNING STABILIZER

Melvin A. Herlin, Salt Lake City, Utah, assignor, by mesne assignments, to the United States of America as represented by the Secretary of the Navy Application March 14, 1946, Serial No. 654,497

6 Claims. (Cl. 200—36)

This invention relates in general to magnetron oscillators and more particularly to external means for tuning and stabilizing the operating frequency thereof.

An external cavity attached in some way to a magnetron has been used for two purposes, tuning and stabilization. The term stabilization refers to the frequency constancy of the magnetron in the face of changes in operating conditions. If the cavity resonator is tuned to a desired frequency and stores an appreciable fraction of the total energy stored in the combination of magnetron and cavity resonator, any tendency of the magnetron to change frequency will be resisted. In fact, susceptibility to frequency changes is reduced by a stabilization factor S defined as:

$$S=\frac{\text{Stored energy in cavity and magnetron}}{\text{Stored energy in magnetron alone}}$$

At the same time, a change in the resonant wave length of the cavity will result in some smaller change in the wave length of the combination of cavity and magnetron.

The coupling of a tuning cavity to a magnetron introduces two new modes into the magnetron mode spectrum, one above and one below the main tuning mode. A high stabilization factor is accompanied by a tendency of the magnetron to operate in one of the extraneous modes. So-called "demoder" loads have been employed between the magnetron and tuning cavity to provide preferential loading to suppress or dissipate the unwanted modes. However, this type of loading causes low efficiency at both ends of the tuning range as the difference between magnetron and tuning cavity wave lengths increases and loading of the desired mode also increases.

Thus, the use of external tunable cavity resonators for stabilizing magnetron frequencies has been limited by the small tuning range available without sacrificing magnetron power output and by susceptibility to interference from extraneous modes of oscillation.

The present invention overcomes these limitations and provides a tuning cavity for a magnetron which will stabilize it at a stabilization factor of the order of 10 and will simultaneously allow tuning the magnetron over a wide range of the order of ten percent of the nominal operating frequency. This contrasts with types of tuning cavities known in the art which afford either a stabilization factor of 10 accompanied by a low tuning range or a low stabilization factor of the order of 2 allowing a 10 percent tuning range.

An object of this invention is to provide a tunable cavity-magnetron combination with a substantial range of tuning.

Another object is to provide a tunable circuit in combination with a magnetron for achieving a fairly high stabilization factor for the combination.

Another object is to provide means in a tunable circuit for suppressing undesired modes of oscillation of the magnetron.

These and other objects and features of this invention will become apparent upon consideration of the following detailed description when taken with the accompanying drawings where:

Figure 1:
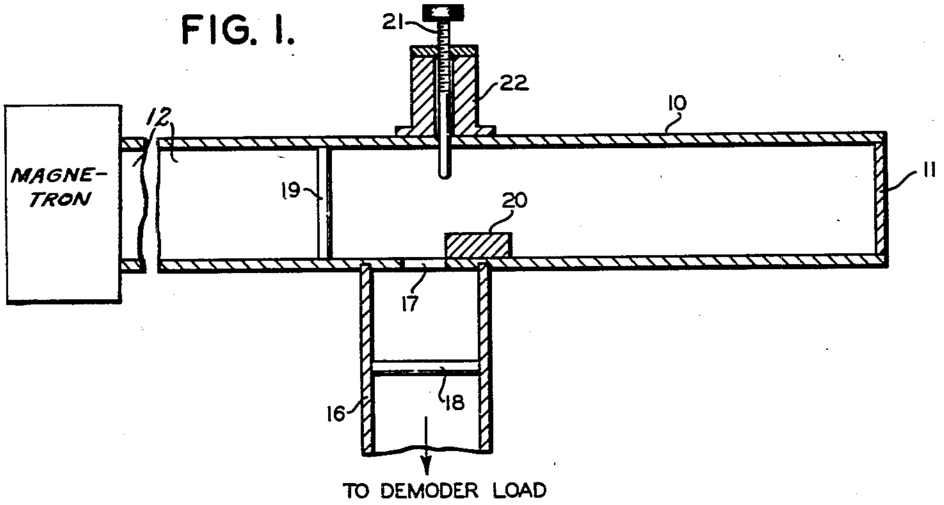
Fig. 1 is a cross sectional view of a resonant cavity built in rectangular wave guide shape embodying the principles of this invention.

Referring to Fig. 1, a section of rectangular wave guide 10 has one end 11 closed and the other end 12 adapted for coupling to a magnetron. The sectional view of the wave guide is taken normal to the narrow face. The electric vectors or the E-field for the dominant mode of transmission of electromagnetic energy in wave guide 10 lie in the transverse plane of the wave guide normal to the direction of propagation of energy to the magnetron at end 12. Wave guide section 16 is an E type branch connected to a broad face of wave guide 10 for coupling to a dissipative demoder load. E type refers by common definition to a branch wave guide connected to the wider side of a main wave guide to provide an equivalent series connection. Iris 17 is formed by a slot cut in the broad face of wave guide 10, this slot being positioned at a point of zero current density for coupling to wave guide 16. Here and hereafter in this specification an iris is taken to denote a transverse section across a wave guide with a pattern of perforation whose geometry determines the magnitude and phase angle of the effective impedance presented by the iris to the passage of electromagnetic energy. Iris 18 is the "demoder" transformer in wave guide 16 to provide the proper demoder load and is physically constructed of cylindrical posts of high-conducting metal placed across wave guide 16 parallel to the E-field. Henceforth in this specification, wave guide 16 will be known according to its function as demoder lead 16. Output iris 19 is similarly constructed in wave guide 10 for impedance matching the cavity to the magnetron. Transformer step 20 traverses the lower broad face of wave guide 10 adjacent iris 17. Tuning screw 21 is mounted in holder 22 in the center of the upper broad face of wave guide 10, opposite transformer step 20.

Figures 2, 3:
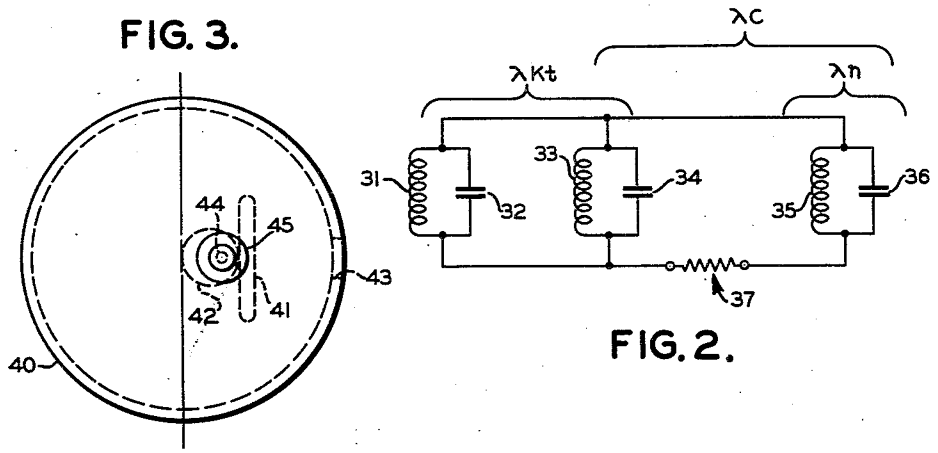
Fig. 2 is the equivalent electrical circuit of Fig. 1.
Figs. 3 and 4 show plan and elevation views respectively of an alternative form of a resonant cavity of cylindrical shape.

A simplified equivalent electrical circuit for the apparatus of Fig. 1 is shown in Fig. 2 in combination with electrical parameters to represent a magnetron and a demoder load. Inductor 31 and capacitor 32 comprise a parallel resonant circuit representing a magnetron oscillator. Inductor 33 and capacitor 34 comprise a parallel resonant circuit representing that portion of wave guide cavity 10 to the left of demoder wave guide 16 in parallel with the magnetron. Inductor 35 and capacitor 36 comprise a parallel resonant circuit representing the remaining portion of wave guide cavity 10 to the right of demoder lead 16. A demoder load connected to demoder lead 16 is represented by resistor 37. Resistor 37 is shown connected between the lower ends of the two resonant circuits representing the cavity portions on either side of demoder lead 16.

When the magnetron and cavity circuits are resonant at the same frequency, the high impedance of the cavity parallel resonant circuit 35, 36 presented in series with loss resistance 37 insures very little power loss. However, if the cavity 35, 36 is tuned away from the combined frequency of magnetron 31, 32 and cavity 33, 34, the series impedance presented by cavity 35, 36 decreases and the loss in resistance 37 increases. This is the effect noted above which has limited the use of tuning cavities and which this invention overcomes.

It is apparent that means to tune the magnetron and cavity together would make available a high stabilization factor together with a wide tuning range. Mechanical ganging of separate cavity and magnetron tuning controls would be extremely complicated if not impossible. This invention provides the answer to the problem by a single tuning motion in the split cavity of Fig. 1. The action of the tuning screw 21 is such that the tuning rate of the part of cavity 10 to the left of the demoder lead 16 tunes itself and the magnetron at the same rate as the part to the right. Thus, demoding action over the entire tuning range is provided without loss of power of the desired mode to the demoder circuit. Referring to Fig. 1 and Fig. 2, the condition which must be met is $$\lambda_{kt}=\lambda_n$$

where $\lambda_{kt}$ is the wave length of magnetron and left part of cavity 10 combined and $\lambda_n$ is the wave length of the right part of cavity 10. If $\lambda_c$ is the wave length of the total cavity 10, it turns out that for a change $\Delta\lambda_c$ there is some smaller change $\Delta\lambda_n$ related to the stabilization factor S as follows:

$$\frac{\Delta\lambda_c}{\Delta\lambda_n}=\frac{S}{S-1}$$

The part of cavity 10 to the right of demoder lead 16 has a large energy storage capacity compared to that at the left. Thus, in order that the tuning rates on either side of demoder lead 16 be equal, tuning screw 21 is placed to the right of demoder iris 17 in the region of higher energy storage. Transformer step 20 raises the bottom of cavity 10 to the right of demoder lead 16 closer to the tuning screw 21. This provides a greater tuning rate of the higher energy storage part of cavity 10 and at the same time provides for placing tuning screw 21 in a region of high electric field where it can effect a wide range of tuning. Without transformer step 20, tuning screw 21 would have to be placed so far to the right in cavity 10 in order to achieve the correct tuning control that it would not be in the maximum electric field and would not have sufficient mechanical motion to tune cavity 10 very far.

Transformer step 20 serves another function in making the right part of cavity 10 the high energy storage part. The portion of cavity 10 to the right of transformer step 20 is roughly a half-wavelength of wave guide, which amounts to a series resonant circuit. Viewed from the low characteristic impedance of the wave guide in the region of step 20, the characteristic impedance of the right part of cavity 10 is relatively high. Transformer step 20 is essentially a quarter wave transformer which transforms the series resonant circuit with high characteristic impedance to a parallel resonant circuit with high characteristic admittance looking into step 20 from the left. Thus step 20 serves the dual function of providing the chief energy storage capacity of cavity 10 in the part beyond the demoder lead 16 from the magnetron end and of raising the bottom of the cavity 10 so that the part beyond demoder lead 16 tunes rapidly enough to keep up with the other part.

Figure 4:
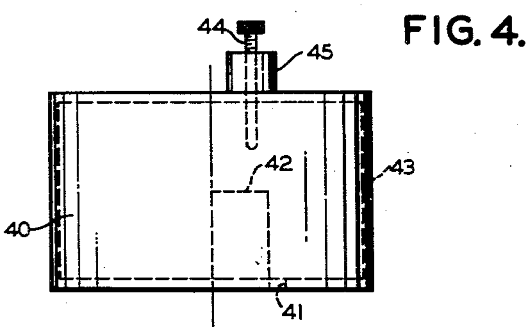

In Figs. 3 and 4 is disclosed an alternative form of this invention in a cylindrical cavity whose mode is analogous to the rectangular wave guide mode described above. Fig. 3 is a plan view of cylindrical cavity 40 and Fig. 4 is an elevation view of cavity 40. Demoder iris 41 is placed along a line of zero total current density as in the previous case. Transformer step 42 is a cylindrical post whose diameter and position are such that it occupies the space between the longitudinal axis of cavity 40 and the current zero point of the cavity up to approximately half the height of cavity 40. The output iris 43 for coupling cavity 40 to the magnetron is in the wall of cavity 40 opposite step 42. The tuning screw 44 in holder 45 extends into cavity 40 through the face opposite step 42.

Thus there is provided a wide range tunable stabilizer for magnetrons which takes the general form of a hollow metal configuration with an output iris and demoder iris.

Although there are shown and described only certain specific embodiments of this invention, the many modifications possible thereof will be readily apparent to those skilled in the art. Therefore, this invention is not to be limited except insofar as is necessitated by the prior art and the spirit of the appended claims.

What is claimed is:

1. A wide range tunable stabilizer for a magnetron comprising, a section of rectangular wave guide cavity closed at one end and adapted for coupling to a magnetron at the other end, an output iris positioned in the end of said wave guide cavity adjacent said other end for matching the impedance of said cavity to the impedance of the magnetron to which it is adapted to be coupled, a demoder iris positioned at a point of zero current density in a broad face of said wave guide cavity, a branch of rectangular wave guide coupling said demoder iris to a dissipative means, a demoder transformer iris positioned in said branch for matching impedances, a transformer step positioned in said wave guide cavity adjacent said demoder iris on the side remote from said other end for providing said remote side with high energy storage capacity, and a tuning screw positioned in said wave guide cavity opposite said transformer step, whereby the tuning rates of the equivalent electrical circuits on both sides of said demoder iris are the same and said dissipative means damps out electromagnetic energy of frequencies differing from the operating frequency of the magnetron to which said stabilizer is adapted to be coupled.

2. A wide range tunable stabilizer for a magnetron comprising, a cylindrical cavity resonator, a demoder iris positioned along a line of zero total current density in a first face of said cavity, a cylindrical transformer step positioned in said cavity between the longitudinal axis and said demoder iris extending out from said first face and occupying substantially half the height of said cavity, an output iris positioned in the wall of said cavity adjacent said demoder iris, and a tuning screw mounted in said cavity directly opposite said transformer step on the second face of said cavity.

3. A wide range tunable stabilizer for an oscillator tube comprising, a cavity resonator, means within said resonator arranged for high energy storage in a first portion of said resonator relative to a second portion thereof, means for coupling said oscillator tube to said second portion, and means for simultaneously tuning said first portion and said second portion plus said oscillator at the same rate of frequency change.

4. A wide range tunable stabilizer for an oscillator tube comprising, a cavity resonator constructed for high energy storage in a first portion thereof relative to a second portion thereof, means for coupling said oscillator to said second portion, a tuning screw for simultaneously tuning said first portion of said resonator and said second portion plus said oscillator, and means associated with said tuning screw for causing said first portion and said second portion plus said oscillator to be tuned at the same rate of frequency change upon adjustment of said tuning screw.

5. A wide range tunable stabilizer for a magnetron comprising, a cavity resonator, transformer means disposed within said cavity resonator for causing a first part of said cavity resonator to have high energy storage relative to a second part thereof, dissipative load means coupled to said cavity resonator between said first and second parts thereof, means for coupling said magnetron to said second part of said cavity resonator, and variable tuning means disposed in said cavity at a point opposite said transformer means, whereby said first part of said cavity resonator and said magnetron plus said second part thereof are tuned at the same rate of frequency change upon variation of said tuning means.

6. A wide range tunable stabilizer for a magnetron comprising, a cylindrical cavity resonator, a demoder iris positioned in a first face of said cavity resonator, a cylindrical transformer step disposed within said cavity resonator adjacent said demoder iris, an output iris in the wall of said cavity resonator, and tuning means in a second face of said cavity wall in operative relation with said transformer step.

References Cited in the file of this patent

UNITED STATES PATENTS

| | | |
|---|---|---|
| 2,373,233 | Dow et al. | Apr. 10, 1945 |
| 2,411,151 | Fisk | Nov. 19, 1946 |
| 2,415,242 | Hershberger | Feb. 4, 1947 |
| 2,473,448 | Rieke | June 14, 1949 |
| 2,485,029 | Bradley | Oct. 10, 1949 |
| 2,485,030 | Bradley | Oct. 10, 1949 |
| 2,485,031 | Bradley | Oct. 10, 1949 |